US012055951B2

United States Patent
Krawiec et al.

(10) Patent No.: US 12,055,951 B2
(45) Date of Patent: Aug. 6, 2024

(54) HIGH FIDELITY TEAMMATE STATE ESTIMATION FOR COORDINATED AUTONOMOUS OPERATIONS IN COMMUNICATIONS DENIED ENVIRONMENTS

(71) Applicant: Rockwell Collins, Inc., Cedar Rapids, IA (US)

(72) Inventors: Bryan M. Krawiec, Ashburn, VA (US); Joel J. Fuster, Panama City, FL (US); Jason J. Jakusz, Nixa, MO (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 311 days.

(21) Appl. No.: 17/684,095

(22) Filed: Mar. 1, 2022

(65) Prior Publication Data

US 2023/0280766 A1   Sep. 7, 2023

(51) Int. Cl.
| G05D 1/00 | (2024.01) |
| B64C 39/02 | (2023.01) |
| B64U 101/30 | (2023.01) |
| H04L 9/40 | (2022.01) |

(52) U.S. Cl.
CPC ........... *G05D 1/104* (2013.01); *B64C 39/024* (2013.01); *G05D 1/106* (2019.05); *H04L 63/1458* (2013.01); *B64U 2101/30* (2023.01); *B64U 2201/102* (2023.01)

(58) Field of Classification Search
CPC ...... G05D 1/104; G05D 1/106; G05D 1/0291; G05D 1/0027; B64C 39/024; H04L 63/1458; B64U 2101/30; B64U 2201/102; F41H 13/00
See application file for complete search history.

(56) References Cited

U.S. PATENT DOCUMENTS

| 9,243,930 B2 | 1/2016 | Bushnell |
| 10,018,482 B2 | 7/2018 | Aymeric et al. |
| 10,114,373 B2 | 10/2018 | Glebov |

(Continued)

FOREIGN PATENT DOCUMENTS

| EP | 1769297 A1 | 4/2007 |
| EP | 1769297 B1 * | 8/2016 ........... G05D 1/0088 |

(Continued)

OTHER PUBLICATIONS

1 Extended European Search Report dated Jul. 11, 2023; European Application No. 23159471.4.

(Continued)

*Primary Examiner* — Anne Marie Antonucci
*Assistant Examiner* — Jewel Ashley Kuntz
(74) *Attorney, Agent, or Firm* — Suiter Swantz IP

(57) ABSTRACT

A mission system for autonomous vehicle (AV) team coordination and a method of using the same are disclosed. A controller included on an AV shares mission data between two or more AVs, and in response to communication denial, generates estimated navigation trajectories for teammate AVs. A simulation outputs estimated navigation states for the teammate AVs. The estimated navigation states are identical or substantially identical to navigation states otherwise generated by controllers included on the teammate AVs. The estimated navigation trajectories are generated based on the estimated navigation states.

20 Claims, 5 Drawing Sheets

(56) References Cited

U.S. PATENT DOCUMENTS

| | | |
|---|---|---|
| 10,319,242 B2 | 6/2019 | Sindlinger et al. |
| 10,347,142 B2 | 7/2019 | Brandao et al. |
| 10,414,494 B2 | 9/2019 | Jourdan |
| 10,564,276 B2 | 2/2020 | Eljarat et al. |
| 10,671,076 B1 | 6/2020 | Kobilarov et al. |
| 11,168,986 B2 | 11/2021 | Allen et al. |
| 2014/0324253 A1 | 10/2014 | Duggan et al. |
| 2017/0090476 A1 | 3/2017 | Letwin et al. |
| 2017/0123421 A1 | 5/2017 | Kentley et al. |
| 2020/0062417 A1 | 2/2020 | Prosser et al. |
| 2020/0380873 A1 | 12/2020 | Boelens et al. |
| 2020/0387163 A1 | 12/2020 | Bhowmick et al. |
| 2021/0286651 A1 | 9/2021 | Ho et al. |
| 2022/0281478 A1 | 9/2022 | Shedge et al. |
| 2023/0033297 A1 | 2/2023 | Vandapel et al. |
| 2023/0280762 A1 | 9/2023 | Krawiec et al. |
| 2023/0280766 A1 | 9/2023 | Krawiec et al. |
| 2023/0280768 A1 | 9/2023 | Krawiec et al. |

FOREIGN PATENT DOCUMENTS

| | | |
|---|---|---|
| EP | 3866139 A1 | 8/2021 |
| GB | 2593263 A | 9/2021 |
| KR | 101772556 B1 | 9/2017 |

OTHER PUBLICATIONS

Dias, Fernando H. C. et al., "Robust aircraft conflict resolution under trajectory prediction uncertainty", arXiv:2012.08230,URL: https://arxiv.org/abs/2012.08230, Dec. 15, 2020.

Pang, Bo et al., "Trajectory Prediction with Latent Belief Energy-Based Model", arXiv:2104.03086v1 [cs.LG] Apr. 7, 2021,URL: https://arxiv.org/pdf/2104.03086.pdf.

Krook et al., Design and Formal Verification of a Safe Stop Supervisor for an Automated Vehicle; 2019 International Conference on Robotics and Automation (ICRA) Palais des congres de Montreal, Canada, May 20-24, 2019; pp. 5607-5613 (Year 2019).

* cited by examiner

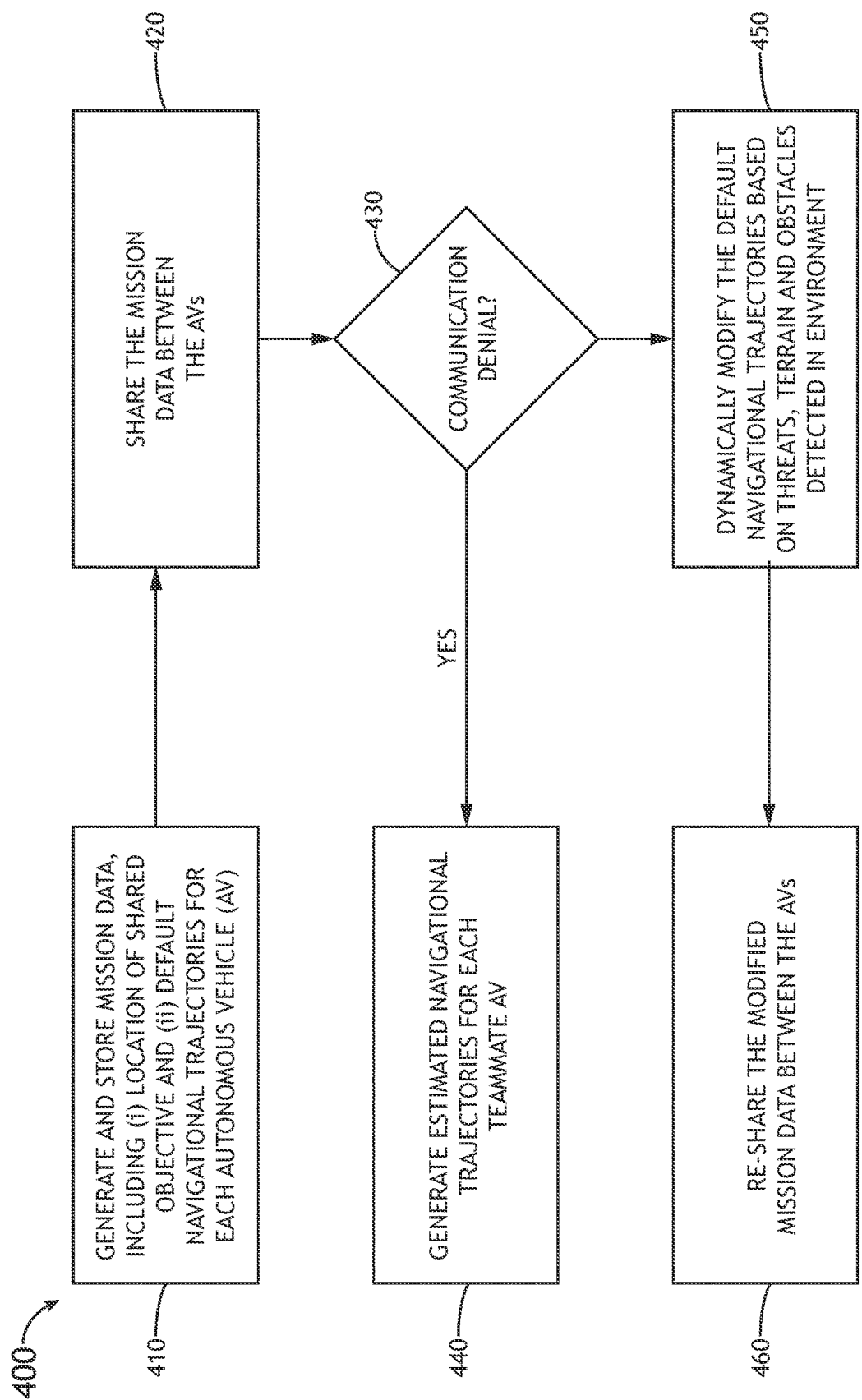

HIGH FIDELITY TEAMMATE STATE ESTIMATION FOR COORDINATED AUTONOMOUS OPERATIONS IN COMMUNICATIONS DENIED ENVIRONMENTS

BACKGROUND

Autonomous vehicle (AV) technology is advancing rapidly in both capability and complexity. In military applications, land-based, air-based, or sea-based AVs perform tasks that are conventionally performed by human operators (e.g., surveillance, target acquisition, reconnaissance, munition strikes, etc.), reducing the risk of bodily harm to military personnel.

SUMMARY

A mission system for AV team coordination is disclosed in accordance with one or more illustrative embodiments of the present disclosure.

In one illustrative embodiment, the mission system comprises a plurality of controllers. Two or more AVs each include a respective one of the plurality of controllers. One of the two or more AVs comprises an ownship AV, and others of the two or more AVs comprise teammate AVs.

A respective one of the controllers stores mission data. The mission data includes information related to: (i) a location of a shared objective, and (ii) a default navigation trajectory for each of the ownship AV and the teammate AVs with respect to the location of the shared objective.

The respective one of the controllers shares the mission data between the two or more AVs by transmitting and receiving signals using a respective communication device on each of the two or more AVs.

Responsive to a communication denial of the signals, the respective one of the controllers generates at least one estimated navigation trajectory for at least one of the teammate AVs with respect to the location of the shared objective.

A simulated teammate guidance and avoidance module is executed using the respective one controller included on the ownship AV. The simulated teammate guidance and avoidance module is a simulation of a teammate guidance and avoidance module.

The teammate guidance and avoidance module is configured to be executed using the respective one controller included on the at least one of the teammate AVs. The teammate guidance and avoidance module is configured to generate at least one teammate navigation state for the at least one of the teammate AVs. The at least one teammate navigation state includes position information, velocity information, and acceleration information.

The simulated guidance and avoidance module executed using the respective one controller included on the ownship AV outputs at least one estimated teammate navigation state. The at least one estimated teammate navigation state is identical or substantially identical to the at least one teammate navigation state otherwise generated by the teammate guidance and avoidance module executed using the respective one controller included on the at least one of the teammate AVs. The at least one estimated navigation trajectory is generated based on the at least one estimated teammate navigation state.

A method for AV team coordination is disclosed in accordance with one or more illustrative embodiments of the present disclosure. Two or more AVs each include a respective one of a plurality of controllers. One of the two or more AVs comprises an ownship AV, and others of the two or more AVs comprise teammate AVs.

In one illustrative embodiment, the method comprises, using the respective one of the plurality of controllers, storing mission data, the mission data including information related to: (i) a location of a shared objective, and (ii) a default navigation trajectory for each of the ownship AV and the teammate AVs with respect to the location of the shared objective.

In another illustrative embodiment, the method comprises sharing the mission data between the two or more AVs by transmitting and receiving signals using a respective communication device on each of the two or more AVs.

In another illustrative embodiment, responsive to a communication denial of the signals, the method comprises generating at least one estimated navigation trajectory for at least one of the teammate AVs with respect to the location of the shared objective.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 5 is a flowchart illustrating a method for coordination of a team of autonomous vehicles (AVs), in accordance with one or more embodiments of the present disclosure.

DETAILED DESCRIPTION

Figure 1:
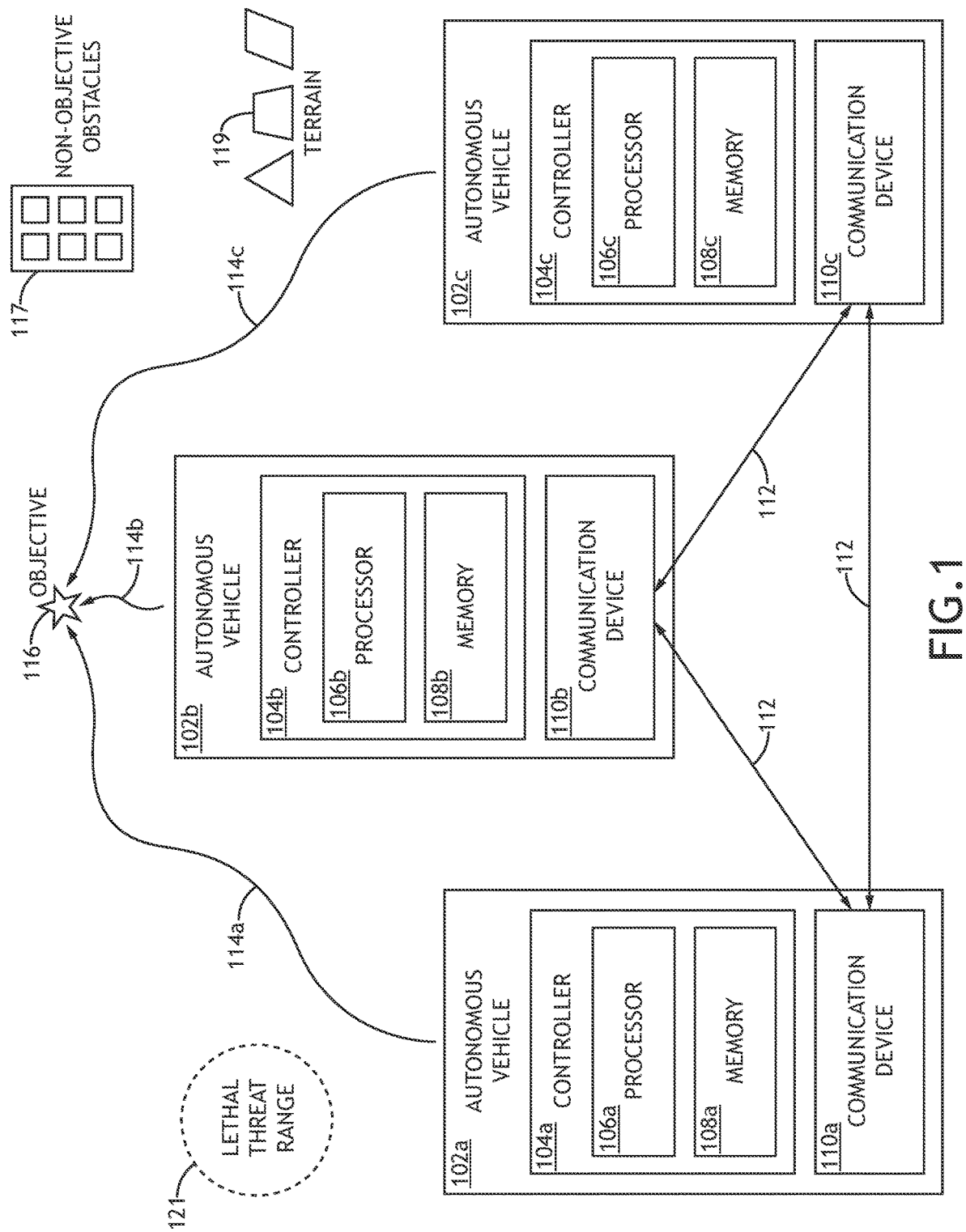
FIG. 1 is a schematic diagram view illustrating a plurality of AVs, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Although a single AV can perform one or more tasks, teams of AVs offer extended mission capabilities (surveillance, munition strike abilities, etc.) and improved redundancy (ability to perform tasks in the presence of disruption). For example, a plurality of AVs can coordinate and navigate toward an objective together, and perform the same or separate tasks at the location of the objective. This way, mission tasks can be completed even in conditions where one or more of the AVs is destroyed or otherwise disabled.

A mission system operating on an AV offers next generation capabilities to autonomous teaming operations including detection, identification, location, and reporting of targets in a battle space, and sharing detection of environmental hazards with friendly vehicles. A mission system may be integrated with a team of AVs such that each AV is aware of an objective (e.g., an adversarial or enemy threat), teammate vehicles (e.g., other friendly AVs in a team), environmental hazards (e.g., mountains, weather), and non-target structures (e.g., buildings, towers, bridges, dams, etc.).

During operation of a mission system, each of the AVs can share relevant mission data with other AVs. For example, using a peer-to-peer (P2P) data link, each AV is capable of transmitting and receiving RF signals with the other AVs. Alternatively, using a centralized data link, each AV communicates with a central hub (e.g., a satellite, ground station, or leader AV) and the central hub relays mission data to the other AVs.

A mission system operates with minimal disruption when maximizing connectivity of a team of AVs. Communication denied environments present a significant challenge to an AV mission system. Communication denial can be caused by radio jamming (i.e., electromagnetic interference [EMU]), environmental hazards (e.g., terrain and weather), structures, multipath, destruction of one or more AVs by adversarial threats (e.g., anti-aircraft weapons), etc. Communication denial can significantly disrupt a mission system since the AVs cannot share complete mission data for the duration of the communication denial. In such a situation, the AVs cannot coordinate decision making in real-time.

Due to an inability to receive teammate navigation states such as position, velocity, acceleration, and time via data link, each AV can forecast teammate behavior for the duration of the communication denial. Naïve forecasting methods (i.e., low-order methods) that simply assume that teammate AVs travel in straight lines (constant velocity) with constant turn-rates (constant acceleration) or similar simplifications produce highly erroneous predictions in a matter of seconds. In practical operational environments such as contested battle spaces and urban canyons, where communications may be intermittent or denied for large amounts of time, the aforementioned problems are unacceptable, since inaccurate prediction of teammate states inhibits effective team decision-making and results in an ineffective and chaotic mission. Thus, a mission system that solves the problems described above is desirable.

Embodiments of the present disclosure are directed to a mission system for AV team coordination, and a method of using the same. The present system and method provide high-fidelity forecasting of teammate navigation state data for the duration of communication denial. The present system and method advantageously reduce uncertainty in teammate navigation state estimates over long durations of time, such that a team of AVs can seamlessly continue missions with confidence for the duration of a communication outage. When communications are available, team level plans are formulated based on teammate navigation state data shared (and latency adjusted) via data link. In contrast, during communication denial, teammate navigation state data may be forecast by simulating teammate behavior, guidance, and avoidance control hierarchies for each teammate AV. In this way, each AV can predict the motion and decision making of the other AVs continuously in real-time.

Ideally, with complete synchronization and identical software, and a representative aircraft model, the simulation provided by the present system and method can provide an exact prediction of teammate maneuvers, with all of the complexity inherent to the mission system (e.g. behavior planning, obstacle avoidance, dynamic constraints, and so on). In practice, some uncertainty may be present. However, the growth of this uncertainty over time may be potentially orders of magnitude smaller with the present system and method than with naïve forecasting methods.

FIG. 1 is a schematic diagram illustrating a plurality of AVs 102a-c, in accordance with one or more embodiments of the present disclosure. Each of the AVs 102a-c may include a respective controller 104a-c (e.g., computers or computing devices), one or more processors 106a-c, a memory 108a-c, and a communication device 110a-c. Although only three AVs 102a-c are shown in FIG. 1, it is contemplated that the plurality of AVs 102a-c may comprise any number of AVs 102a-c (for example, 50 AVs, 100 AVs, etc.).

The AVs 102a-c may comprise aerial, land, or sea vehicles. For example, the AVs 102a-c may comprise one or more unmanned aerial vehicles (UAVs) or drones. The AVs 102a-c may perform one or more mission tasks. For example, the AVs 102a-c may travel to a location of a shared objective 116 via default navigation trajectories 114a-c, and perform additional mission tasks at the shared objective 116. The AVs 102a-c may encounter non-objective obstacles 117 (buildings, towers, bridges, dams, etc.), terrain 119 (mountains, hills, canyons, valleys, rocks, etc.), adversarial threats 121 (e.g., military structures, vehicles, weapons, etc.), or weather (e.g., thunderstorms, hurricanes, fog, ice, snow, rain, winds, etc.), In some embodiments, a user (e.g., one or more pilots) of the AVs 102a-c may utilize a ground station controller (not shown) communicatively coupled (via a direct radio data link or a satellite data link) to the AVs 102a-c. The user may be physically remote from the AVs 114a-c, and may interface with the AVs 114a-c using input devices such as keyboards and joysticks, and output devices such as monitors.

In some embodiments, the user may select a mission type for the AVs 102a-c. The mission type may define the types of decisions and tasks performed by the AVs 102a-c. For example, the mission type may define a reconnaissance or surveillance mission in which one or more of the AVs 102a-c is configured to gather intelligence (by capturing images using sensors) at the location of the shared objective 116. In some embodiments, the mission type may define a munition strike in which one or more of the AVs 102a-c is configured to deliver an explosive or otherwise mechanically destructive payload to an adversarial threat (for example, a military structure, vehicle, or weapon at the location of the shared objective 116). In some embodiments, the mission type may be a combination of both reconnaissance and munition strike mission types, such that different tasks are distributed among the AVs 102a-c (for example, some of the AVs 102a-c on a first sub-team may capture images, while others of the AVs 102a-c on a second sub-team may deliver a payload). It is noted that the mission type may not be limited to the mission types described herein, and that other mission types are contemplated.

The AVs 102a-c may store mission data (e.g., using the controllers 104a-c), including information related to the location of the shared objective 116, the default trajectories 114a-c, and positions and geometry of the obstacles 117, the terrain 119, and the threats 121. The mission data may be predetermined at the start of a mission, and may be continuously updated in real-time for the duration of the mission.

The information related to the location of the shared objective 116 and the default trajectories 114a-c may be stored in the form of a graph including one or more nodes (e.g., waypoints or navigation fixes) and one or more edges (e.g., legs) connecting the nodes. The information related to the location of the shared objective 116 and the default trajectories 114a-c may be defined in three dimensions (3D) using latitude information, longitude information, and altitude information. In some embodiments, The information related to the location of the shared objective 116 and the default trajectories 114a-c may be defined in four dimensions (4D) using latitude information, longitude information, altitude information, and time. In some embodiments, the mission data may include additional information, such as (i) mission type, (ii) images of terrain, structures, or adversarial threats, (iii) information related to detection of terrain, structures, or adversarial threats, etc.

Each of the controllers 104a-c may be communicatively coupled to a respective communication device 110a-c, such that each controller 104a-c transmits and receives data via the respective communication device 110a-c. The communication device 110a-c may comprise one or more antennas, including an RF front end, transmitter/receiver, and radiating elements, and may communicate in the RF frequency range. Thus, the mission data may be shared between the AVs 102a-c using the communication devices 110a-c.

It is noted herein that, for the purposes of the present disclosure, the term "processor" or "processing element" may be broadly defined to encompass any device having one or more processing or logic elements, for example, one or more central processing units (CPUs), one or more graphics processing units (GPUs), one or more micro-processor devices, one or more application specific integrated circuit (ASIC) devices, one or more field programmable gate arrays (FPGAs), or one or more digital signal processors (DSPs). In this sense, the one or more processors 106a-c may include any device configured to execute algorithms and/or instructions (e.g., program instructions stored in memory), and may be configured to perform method steps described in the present disclosure. The memory 108a-c may include any storage medium known in the art suitable for storing program instructions executable by the associated one or more processors. For example, the storage medium may include, but is not limited to, a read-only memory (ROM), a random-access memory (RAM), a magnetic or optical memory device (e.g., hard disk), a magnetic tape, a solid-state drive, and the like. The memory 108a-c may also be configured to store mission data, including information related to the location of the shared objective 116, the default trajectories 114a-c, and positions and geometry of the obstacles 117, the terrain 119, and the threats 121.

Figure 2:
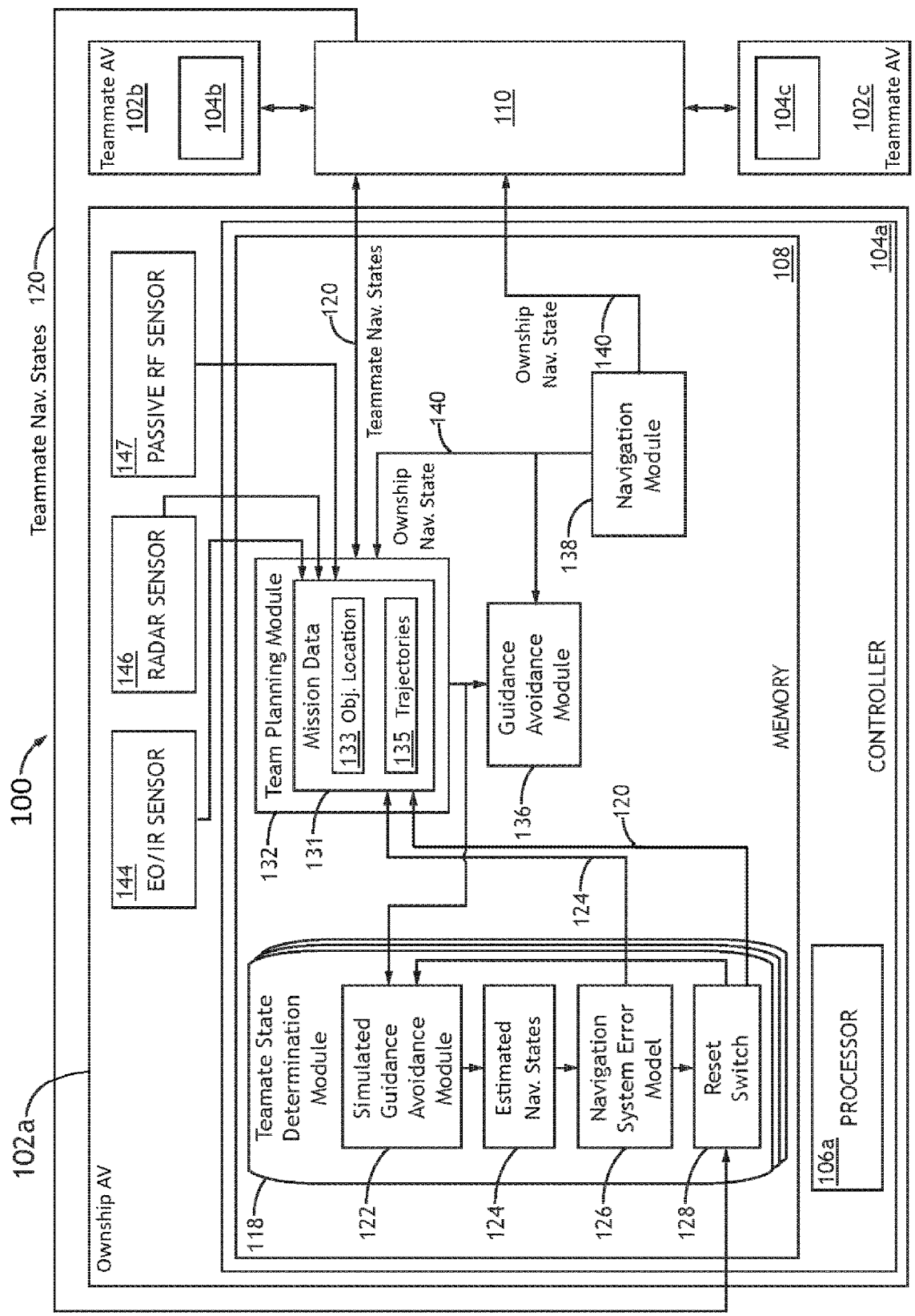
FIG. 2 is a schematic diagram view illustrating a mission system for autonomous AV coordination, in accordance with one or more embodiments of the present disclosure.

FIG. 2 is a schematic diagram view illustrating a mission system 100 including the plurality of controllers 104a-c, in accordance with one or more embodiments of the present disclosure. Each of the AVs 102a-c may include a respective one of the controllers 104a-c.

It is noted herein that the AV 102a may be construed as an "ownship AV," and the AVs 102b and 102c may each be construed as a "teammate AV." However, it is noted herein that any particular one the AVs 102a-c may be construed as an "ownship AV," and that the others of the AVs 102a-c (that are not said particular one of the AVs 102a-c) may be construed as "teammate AVs."

In some embodiments, the mission data 131 may be predetermined or input by a user of the system 100. In some embodiments, mission data 131 may be generated automatically by at least one controller 104a-c of the AVs 102a-c. For example, the information 133 related to the location of the shared objective 116 and/or the information 135 related to the default trajectories 114a-c may be generated using a team planning module 132 stored on at least one memory 108a-c and executed by at least one of the processor(s) 106a-c. The team planning module 132 may include or may interface with additional modules (e.g., submodules) such as a guidance and avoidance module 136, navigation module 138, teammate state determination module 118, etc. The modules described herein may be implemented via, for example, class-based object-oriented programming (OOP).

The team planning module 132 may be configured to perform team-level mission planning. The team planning module 132 may be configured to use the mission data 131, teammate navigation states 120, and ownship navigation state 140 to assign the AVs 102a-c to one or more objectives 116 and compute the default navigation trajectories 114. The teammate navigation states 120 may include position, velocity, acceleration and time for each respective teammate AV 102*b-c*. The ownship navigation state 140 may include position, velocity, acceleration and time for the ownship AV 102*a*.

The team planning module 132 may be configured to form sub-teams of AVs 102*a-c* to accomplish the allocated objectives. The team planning module 132 may break up the sub-teams in response to contingencies (e.g., an AV 102 may be dropped as a communication relay node in response to a communication range limit being reached). The team planning module 132 may issue re-plans based on changes in mission-level objectives or changes in team composition.

The guidance and avoidance module 136 may be configured to control behavior of the ownship AV 102*a* by steering along the trajectory 114*a* toward the objective 116, while avoiding the obstacles 117, the terrain 119, and the threat 121. The guidance and avoidance module 136 may be configured to modify an ownship navigation state 140 for the ownship AV 102*a* (e.g., when executed using the ownship controller 104*a*). Additionally, the guidance and avoidance module 136 may generate respective teammate navigation states 120 (when executed using the respective controller 104*b-c* of the teammate AVs 102*b-c*).

The guidance and avoidance module 136 may control the flight of a UAV 102*a-c* and/or a respective payload at high-rate (e.g. using heading, altitude, vertical speed, and airspeed for platform steering, as opposed to only waypoints). The guidance and avoidance module 136 may initiate movement of the AV 102*a*. For example, if the AV 102*a* is a UAV, the module 136 may interface with an autopilot system, a flight management system (FMS), a flight surface control system, an engine/motor system, etc. Propulsion may be initiated (e.g., via electric or combustion motor), and the flight control surfaces of the AV 102*a* (e.g., spoilers, flaps, etc.) may be actuated such that the AV 102*a* travels toward the shared objective 116 via the trajectory 114*a*.

The guidance and avoidance module 136 may monitor the state of the AVs 102*a-c* for upcoming emergency or proximity conditions, and may autonomously override selected actions and mission decisions only when strictly necessary. The guidance and avoidance module 136 may provide short-term or immediate steering to avoid terrain, obstacles, or adversarial threats, such that the steering does not interfere with long term planning. The guidance and avoidance module 136 may include a variety of monitors that are arbitrated with priority (e.g., peer collisions, terrain, keep-out zones, keep-in zones, threatened occupancy map cells, etc.).

The navigation module 138 may be configured to determine the ownship navigation state 140. The ownship navigation state 140 may include a current position, velocity, and acceleration of the ownship AV 102*a*. In some embodiments, the ownship navigation state 140 may be generated using an inertial measurement unit (IMU) and/or a global positioning system (GPS).

In some embodiments, the team planning module 132 may be configured to dynamically modify the mission data 131 by modifying the information 133 related to the location of the shared objective, the information 135 related to the default navigation trajectories of each AV 102, information related to mission type, etc.

For example, the team planning module 132 may modify the mission data 131 in response to the detection and/or identification of adversarial threats (e.g., military structures, vehicles or weapons), terrain (mountains, hills, canyons, valleys, rocks, etc.), weather (e.g., thunderstorms or high winds), or non-objective obstacles (buildings, towers, bridges, dams) in an environment surrounding at least one of the AVs 102*a-c*.

Each of the AVs 102*a-c* may include an EO/IR imaging sensor 144, a radar imaging sensor 146, and/or a passive RF sensor 147. The imaging EO/IR sensor 144 may be a charge-coupled device (CCD) or CMOS device, may operate in the visual or IR spectral range, and may be configured to generate images of the environment. The radar imaging sensor 146 may transmit signals (e.g., pulses of signals in the RF spectral range), receive reflected return signals, and generate images based on the return signals. The passive RF sensor 147 may detect passive radiation (e.g., black-body radiation) and the characteristics of those emissions may be used to geolocate and identify threats (i.e., without imagery). The combination of imaging sensors 144 and 146 and the passive RF sensor 147 may advantageously provide a redundant system for detecting threats (in case one or more of the sensors stops functioning).

The images generated by the EO/IR imaging sensor 144 and the radar imaging sensor 146, and/or the emissions detected by the passive RF sensor 147, may be used to construct an occupancy map (not shown) of the surrounding environment of each AV 102*a-c*. The occupancy map may be a 2D occupancy map (e.g., comprising a plurality of pixels) or a 3D occupancy map (e.g., comprising a plurality of voxels). Portions of the occupancy map may be periodically updated based on the detection and/or identification of adversarial threats, terrain, weather, or non-objective obstacles.

The occupancy map generated using data from the sensors 144, 146 and/or 147 may be used for the detection and/or identification of adversarial threats 121, terrain 119, or non-objective obstacles 117. The images may be processed using a target recognition module (not shown) executed using the controller 104*a* of the ownship AV 102*a* and/or the controller 104*b-c* of one of the teammate AVs 102*a-c*. The target recognition module may identify characteristics of adversarial threats 121, terrain 119, or non-objective obstacles 117 (for example, using a classification engine) in the images. The characteristics may include, for example, shapes or colors in portions of the images. The classification engine may be a machine learning-based or neural network-based model that is trained using labeled image data (i.e., supervised learning). The adversarial threats 121, terrain 119, or non-objective obstacles 117 identified by the target recognition module may be labeled in the occupancy map (e.g., by labeling corresponding pixels with identifiers).

Based on the detection and/or identification information provided by the sensors 144, 146, 147, the target recognition module, and/or the occupancy map, the team planning module 132 may dynamically modify the information 135 related to the default navigation trajectories 114 of the AVs 102*a-c*. In an absence of communication denial (i.e., when communications are available), the modified mission data 131, including modified default navigation trajectories 135, may be reshared between the AVs 102*a-c* using the respective communication devices 110*a-c*.

Communication denial may entail partial or complete disruption of the signals 112 transmitted between the AVs 102*a-c*, and therefore the inability to share the mission data 131. In response to a presence of communication denial, a teammate state determination module 118 may be executed by the controller 104*a* of the ownship AV 102*a* (or any of the AVs 102*a-c*) to generate an estimated navigation state 124 for each teammate AV 102*a-c* that is denied communication. Each estimated navigation state 124 may include position, velocity, and acceleration.

The teammate state determination module 118 executed by the controller 104*a* of the ownship AV 102*a* may be a high-fidelity simulation of the decision-making and maneuvering modules executed by the controllers 104*b-c* of the communication-denied teammate AVs 102*b-c*. For example, the simulation provided by the teammate state determination module 118 may be identical or substantially identical to the output of the guidance and avoidance module 136 executed by the controllers 104*b-c* of the teammate AVs 102*b-c*.

The simulation may generate an accurate representation of the estimated navigation states 124 of the teammate AVs 102*b-c*. The simulation may imitate all of the capabilities of the respective communication-denied teammate AV 102*b-c*, and may imitate situations to which the respective communication-denied AV 102*b-c* is configured to respond. Thus, the simulated guidance and avoidance module 122 may be substantially similar in structure and function to the guidance and avoidance module 136 that may be executed, for example, using a controller 104*b-c* of a teammate AV 102*b-c*.

In response to communication denial, the teammate state determination module 118 may generate one or more estimated teammate navigation states 124 for at least one of the communication-denied teammate AVs 102*b-c*. The simulated guidance and avoidance module 122 may be configured to generate the estimated teammate navigation states 124. The estimated teammate navigation states 124 may be identical, substantially identical, or substantially similar to the teammate navigation states 120 otherwise generated by the teammate guidance and avoidance module 136 executed using a controller 104*b-c* of a teammate AV 102*b-c*. The estimated teammate navigation states 124 may be used by the team planning module 132 to generate the one or more estimated navigation trajectories.

A navigation error module 126 may be configured to provide accurate uncertainty estimates for the estimated navigation states 124. In some embodiments, the uncertainty estimates may be generated via error analysis where covariances are tallied based on expected navigation system errors. Alternatively, the uncertainty estimates may be generated via a predictive measure where offline simulations are performed (e.g., Monte Carlo testing) and the results are analyzed to form a heuristic (a "rule of thumb," "policy," etc.) for inflating the uncertainty over time for the duration of communication denial.

During communication availability, a reset module 128 may be configured to pass teammate navigation states 120 to the team planning module 132 (with a latency adjustment). The reset module 128 may receive the teammate navigation states 120 via the communication device 110.

During communication denial, the reset module 128 may initiate or instruct the simulated guidance and avoidance module 122 to generate the estimated navigation states 124. The reset module 128 may be programmed, for example, using a conditional expression that returns a Boolean value (using an if/else statement, e.g., where communication availability represents a "True" condition and communication denial represents a "False" condition).

In some embodiments, the team planning module 132 may be configured to modify the mission data 131 by storing the estimated navigation trajectories generated using the estimated navigation states 124. For example, the estimated navigation trajectories can be stored on the memory 108 as part of the mission data 131.

The estimated navigation trajectories may replace or be prioritized over the corresponding default navigation trajectory 114 for each of the communication denied teammate AVs 102*b-c*. The estimated navigation trajectories 124 may then be used to modify mission decisions for the ownship AV 102*a* (for example, the ownship navigation state 140) for the duration of the communications denial.

In some embodiments, the team planning module 132 may be configured to initiate a regroup event. During the regroup event, the teammate AVs 102*a-c* may re-synchronize by directing the AVs 102*a-c* to regroup at a location (rally point). The location may be, for example, a recent location with communication availability.

Figure 3:
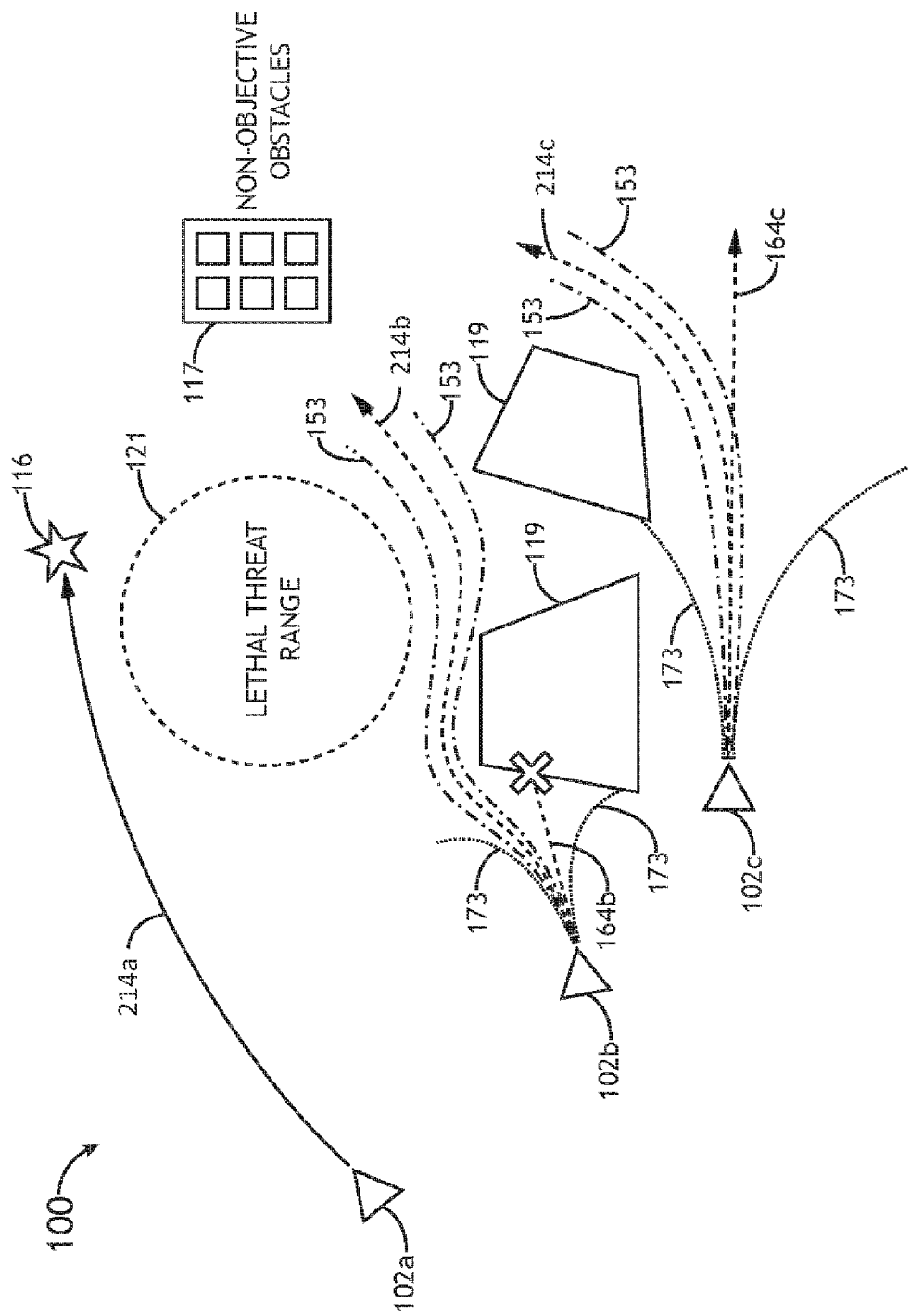
FIG. 3 is a conceptual diagram illustrating a comparison between predictions output by conventional naïve forecasting and predictions output by the mission system shown in FIG. 2, in accordance with one or more embodiments of the present disclosure.

FIG. 3 is a conceptual diagram illustrating a comparison between predictions output by conventional naïve forecasting and predictions output by the present mission system 100. As shown, the AVs 102*a-c* experience communication denial while en-route to the objective 116. The environment is complex and contains numerous obstacles 117, terrain 119, and a lethal adversarial threat 121 (e.g., an anti-aircraft weapon).

If the ownship vehicle 102*a* predicts the motion of the teammate AVs 102*b* and 102*c* with a naïve method such as constant velocity forecasting, the teammate 102*b* is predicted to crash straight into the terrain 119 with a trajectory 164*b*, and the teammate 102*c* is predicted to travel into the distance and away from the objective 116 with a trajectory 164*c*. The naïve trajectories 164*b-c* are calculated with large (i.e., erroneous) uncertainty bounds 173.

In comparison, the trajectories 214*a-c* generated by the present invention (which may be, in some embodiments, estimated trajectories generated using the estimated navigation states 124 described with respect to FIG. 2) involve more complex and accurate motion, with significantly lower uncertainty bounds 153. This low uncertainty enables the ownship AV 102*a* to generate improved team-level decisions for the duration of communication denial since the estimated teammate trajectories 214*a-c* are more accurate, therefore ensuring a more seamless mission continuation.

Figure 4:
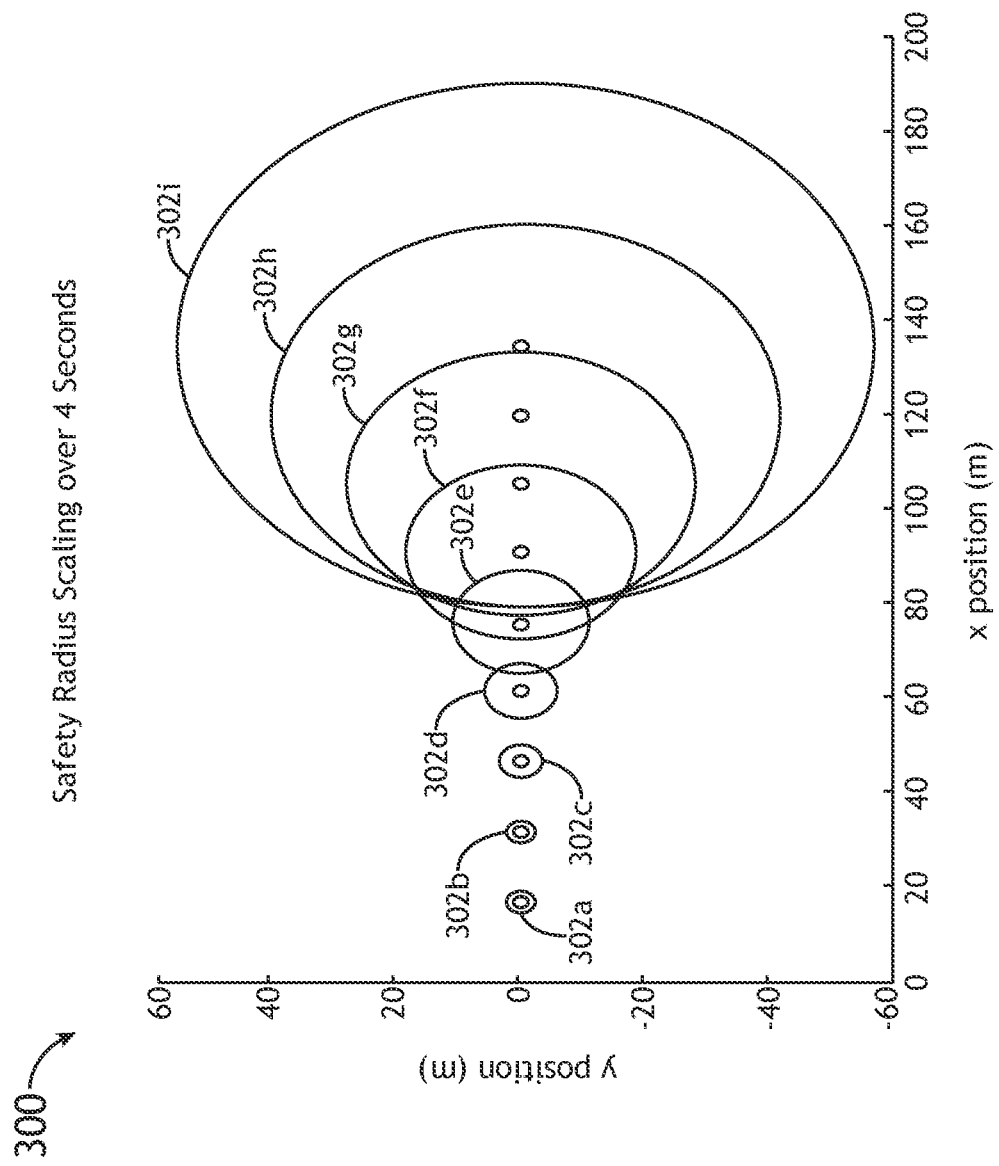
FIG. 4 is a conceptual plot illustrating inaccurate predictions output by conventional naïve forecasting.

FIG. 4 is a conceptual plot 300 illustrating how conventional naïve forecasting results in inaccurate teammate trajectory predictions. As described above, naïve forecasting methods rapidly result in inaccurate teammate state estimates. In FIG. 4, an AV (e.g., one of the AVs 102*a-c*) starts at position (0, 0) and advances in x-position over the duration of 4 seconds. The circles 302*a-i* represent the CEP95 (circular error probable; 95% probability that the AV position is within the circle) for that AV with a constant turn-rate assumption based on the last received state data at (0,0). As shown, the uncertainty grows significantly quickly such that even after 4 seconds, the uncertainty is large (over 40 meters). This large uncertainty is partly due to some level of error in the last received position, velocity, and turn-rate of the AV. However, the large uncertainty is mainly due to the consideration that turn-rate, velocity, and so forth may change dramatically over time.

FIG. 5 is a flowchart illustrating a method 400 for coordination of a team of AVs, in accordance with one or more embodiments of the present disclosure. The present method 400 may be a method of using the mission system 100 described with respect to FIG. 2.

At 410, mission data may be generated and stored. The mission data may include (i) a location of a shared objective and (ii) default navigation trajectories for each AV. The mission data may be predetermined at the start of a mission, and may be continuously updated in real-time for the duration of the mission. The mission data may be generated using an ownship navigation state and one or more teammate navigation states.

At 420, the mission data, the ownship navigation state, and the teammate navigation states may be shared with other AVs. For example, the AVs may share mission data and navigation states using a peer-to-peer [P2P] data link, where each AV is capable of transmitting and receiving RF signals with every other AV. Alternatively, using a centralized data link, each AV communicates with a central hub (e.g., a satellite, ground station, or leader AV), and the central hub relays mission data and navigation states to the other AVs.

At 430, in response to a presence of communication denial, the method proceeds to step 440. Otherwise, in an absence of communication denial, the method proceeds to step 450.

At 440, during or in response to communication denial, estimated teammate navigation states may be generated using a controller of an ownship AV. A simulation executed using the controller of the ownship AV outputs the estimated teammate navigation states. The estimated teammate navigation states may be identical or substantially identical to navigation states otherwise generated by a teammate guidance and avoidance module executed using the controller of a communication-denied teammate AV. Estimated navigation trajectories may be generated based on the estimated teammate navigation states. The estimated navigation trajectories may replace or be prioritized over default navigation trajectories for the communication-denied teammate AVs, such that the estimated navigation trajectories replace the default navigation trajectories when used for mission planning, coordination, task allocation, etc.

At 450, in the absence of communication denial (i.e., communication availability), the mission data may be modified, for example, by modifying information related to the location of the shared objective or the default navigation trajectories of each AV. The mission data may be modified in response to the detection and/or identification of adversarial threats (e.g., military structures, vehicles or weapons), terrain (mountains, hills, canyons, valleys, rocks, etc.), weather (e.g., thunderstorms or high winds), or non-objective obstacles (buildings, towers, bridges, dams) in an environment surrounding the AVs.

At 460, in the absence of communication denial, the modified mission data may be reshared between the AVs 102*a-c* using the respective communication devices 110*a-c*. The mission data may be continuously modified in real-time for the duration of communications availability.

The present system and method significantly improves mission effectiveness and continuity throughout communications outages, and may be especially advantageous in situations where numerous aerial AVs are operating in a dense urban environment.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A mission system for autonomous vehicle (AV) team coordination, comprising:
   a plurality of controllers;
   wherein two or more AVs each include a respective one of the plurality of controllers,
   wherein one of the two or more AVs comprises an ownship AV, and others of the two or more AVs comprise teammate AVs,
   wherein the respective one of the plurality of controllers includes one or more processors configured to execute program instructions causing the one or more processors to:
   store mission data, the mission data including information related to:
   (i) a location of a shared objective, and (ii) a default navigation trajectory for each of the ownship AV and the teammate AVs with respect to the location of the shared objective;
   share the mission data between the two or more AVs by transmitting and receiving signals using a respective communication device on each of the two or more AVs; and
   responsive to a communication denial of the signals, generate at least one estimated navigation trajectory for at least one of the teammate AVs with respect to the location of the shared objective,
   wherein:
   (a) a simulated teammate guidance and avoidance module is executed using the respective one controller included on the ownship AV,
   (b) the simulated teammate guidance and avoidance module is a simulation of a teammate guidance and avoidance module, the teammate guidance and avoidance module being configured to be executed using the respective one controller included on the at least one of the teammate AVs,
   (c) the teammate guidance and avoidance module is configured to generate at least one teammate navigation state for the at least one of the teammate AVs, wherein the at least one teammate navigation state includes position information, velocity information, and acceleration information,
   (d) the simulated guidance and avoidance module executed using the respective one controller included on the ownship AV outputs at least one estimated teammate navigation state,
   (e) the at least one estimated teammate navigation state being identical or substantially identical to the at least one teammate navigation state otherwise generated by the teammate guidance and avoidance module executed using the respective one controller included on the at least one of the teammate AVs, and
   (f) the at least one estimated navigation trajectory is generated based on the at least one estimated teammate navigation state.

2. The mission system of claim 1, wherein the mission data including the information related to (i) the location of the shared objective, and (ii) the default navigation trajectory for each of the ownship AV and the teammate AVs with respect to the location of the shared objective, is defined in:
   altitude information,
   longitude information, and
   latitude information.

3. The mission system of claim 1, wherein the mission data, including the information related to the default navigation trajectory for at least one of the ownship AV or the teammate AVs, is modified responsive to detection of at least one of threats, terrain or non-objective obstacles in an environment surrounding the at least one of the ownship AV or the teammate AVs.

4. The mission system of claim 3, wherein, in an absence of the communication denial, the modified mission data including the modified default navigation trajectory is reshared between the two or more AVs using the respective communication device on each of the two or more AVs.

5. The mission system of claim 3, wherein the detection of threats, terrain or non-objective obstacles in an environment surrounding each of the two or more AVs is performed by:
- (1) generating images of the environment using at least one of EO/IR imaging sensors or radar imaging sensors, and
- (2) processing the images using a target recognition module executed using the respective one controller included on the ownship AV or the respective one controller included on the at least one of the teammate AVs.

6. The mission system of claim 3, wherein the detection of threats, terrain or non-objective obstacles in an environment surrounding each of the two or more AVs is performed using a passive RF detector that detects passive radiation.

7. The mission system of claim 1, wherein the sharing of the mission data is disrupted during the communication denial, and the communication denial is caused by at least one of:
- terrain,
- one or more non-objective obstacles, or
- one or more adversarial threats.

8. The mission system of claim 7, wherein the one or more adversarial threats comprise at least one of a military structure, a military vehicle, or a military weapon.

9. The mission system of claim 7, wherein the one or more adversarial threats comprise radio jamming.

10. The mission system of claim 1, wherein the mission data is modified by storing the estimated navigation trajectory for the at least one of the teammate AVs, wherein the estimated navigation trajectory replaces or is prioritized over the corresponding default navigation trajectory for the at least one of the teammate AVs.

11. A method for autonomous vehicle (AV) coordination,
- wherein two or more AVs each include a respective one of a plurality of controllers,
- wherein one of the two or more AVs comprises an ownship AV, and others of the two or more AVs comprise teammate AVs,
- using the respective one of the plurality of controllers, storing mission data, the mission data including information related to: (i) a location of a shared objective, and (ii) a default navigation trajectory for each of the ownship AV and the teammate AVs with respect to the location of the shared objective;
- sharing the mission data between the two or more AVs by transmitting and receiving signals using a respective communication device on each of the two or more AVs; and
- responsive to a communication denial of the signals, generating at least one estimated navigation trajectory for at least one of the teammate AVs with respect to the location of the shared objective,
- wherein:
  - (a) a simulated teammate guidance and avoidance module is executed using the respective one controller included on the ownship AV,
  - (b) the simulated teammate guidance and avoidance module is a simulation of a teammate guidance and avoidance module, the teammate guidance and avoidance module being configured to be executed using the respective one controller included on the at least one of the teammate AVs,
  - (c) the teammate guidance and avoidance module is configured to generate at least one teammate navigation state for the at least one of the teammate AVs, wherein the at least one teammate navigation state includes position information, velocity information, and acceleration information,
  - (d) the simulated guidance and avoidance module executed using the respective one controller included on the ownship AV outputs at least one estimated teammate navigation state,
  - (e) the at least one estimated teammate navigation state being identical or substantially identical to the at least one teammate navigation state otherwise generated by the teammate guidance and avoidance module executed using the respective one controller included on the at least one of the teammate AVs, and
  - (f) the at least one estimated navigation trajectory is generated based on the at least one estimated teammate navigation state.

12. The method of claim 11, wherein the mission data including the information related to (i) the location of the shared objective, and (ii) the default navigation trajectory for each of the ownship AV and the teammate AVs with respect to the location of the shared objective, is defined in:
- altitude information,
- longitude information, and
- latitude information.

13. The method of claim 11, wherein the mission data, including the information related to the default navigation trajectory for at least one of the ownship AV or the teammate AVs, is modified responsive to detection of at least one of threats, terrain or non-objective obstacles in an environment surrounding the at least one of the ownship AV or the teammate AVs.

14. The method of claim 13, wherein, in an absence of the communication denial, the modified mission data including the modified default navigation trajectory is reshared between the two or more AVs using the respective communication device on each of the two or more AVs.

15. The method of claim 13, wherein the detection of threats, terrain or non-objective obstacles in an environment surrounding each of the two or more AVs is performed by:
- (1) generating images of the environment using at least one of EO/IR imaging sensors or radar imaging sensors, and
- (2) processing the images using a target recognition module executed using the respective one controller included on the ownship AV or the respective one controller included on the at least one of the teammate AVs.

16. The method of claim 13, wherein the detection of threats, terrain or non-objective obstacles in an environment surrounding each of the two or more AVs is performed using a passive RF detector that detects passive radiation.

17. The method of claim 11, wherein the sharing of the mission data is disrupted during the communication denial, and the communication denial is caused by at least one of:
- terrain,
- one or more non-objective obstacles, or
- one or more adversarial threats.

18. The method of claim 17, wherein the one or more adversarial threats comprise at least one of a military structure, a military vehicle, or a military weapon.

19. The method of claim 17, wherein the one or more adversarial threats comprise radio jamming.

20. The method of claim 11, wherein the mission data is modified by storing the estimated navigation trajectory for the at least one of the teammate AVs, wherein the estimated navigation trajectory replaces or is prioritized over the corresponding default navigation trajectory for the at least one of the teammate AVs.

\* \* \* \* \*